Sept. 16, 1947.    P. V. COLOMBO    2,427,444
AUTOMATIC TEMPERATURE CONTROL SYSTEMS
Filed March 12, 1946    2 Sheets—Sheet 1

PAUL V. COLOMBO
INVENTOR.

BY: [signature]
Attorney

Patented Sept. 16, 1947

2,427,444

UNITED STATES PATENT OFFICE 2,427,444

AUTOMATIC TEMPERATURE CONTROL SYSTEM

Paul V. Colombo, Plainfield, N. J., assignor to Della Doris Levine, doing business under the firm name and style of Electronic Utilities Co., New York, N. Y.

Application March 12, 1946, Serial No. 653,785

14 Claims. (Cl. 219—44)

The present invention relates to heat control systems and more particularly to automatic electrical control systems for various types of heating means.

An object of this invention is to provide a novel, improved, automatic, electrical control system for a heating means, whereby when the material heated has attained a predetermined temperature, the heat shall be discontinued thereafter a predetermined length of time. Heating means as here referred to may be of the types operated by electricity, gas or otherwise.

Another object of this invention is to provide an electrically operated control system of novel and improved construction and having a novel mode of operation, for heaters of various kinds employed for heating materials in the liquid state, whereby the heater shall be automatically shut off after the liquid material has reached boiling temperature and such boiling has continued for a predetermined period of time.

A further object hereof is to provide a novel and improved electrical system which is automatic in operation and adapted to control the operation of coffee percolators, whereby the heat applied, is automatically discontinued after a predetermined percolating period, so that coffee of any desired strength may be brewed.

Another object of the present invention is to provide a novel and improved automatic electrical control system of the character mentioned which is simple in construction, reasonably cheap to manufacture, adaptable for use with heating systems of various types and numerous applications, and which is efficient in carrying out the purposes for which it is designed.

Other objects and advantages will become apparent as this disclosure proceeds.

In the accompanying drawings forming part of this application, similar characters of reference indicate corresponding parts in all the views.

Figure 1:
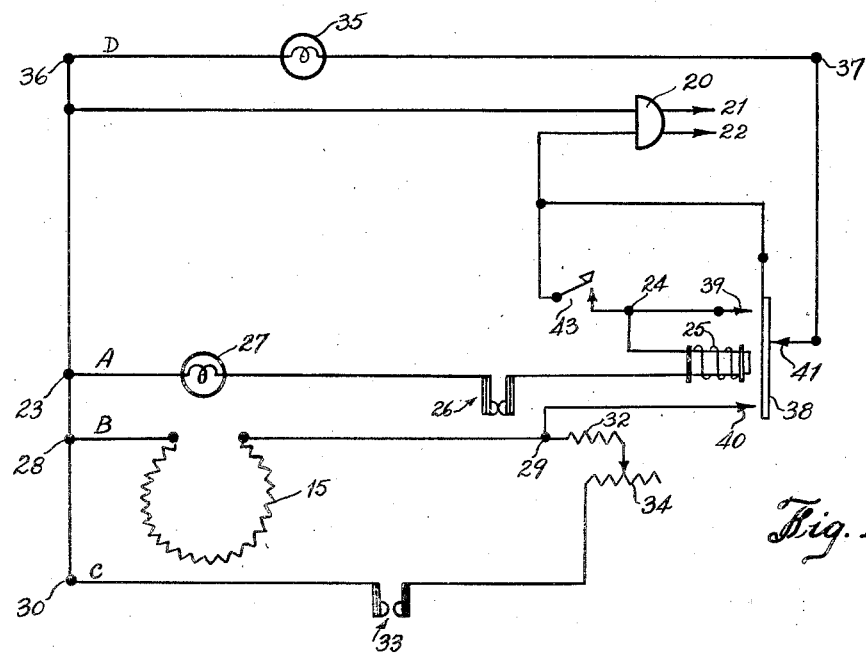
Fig. 1 is a wiring diagram of a heat control system embodying the teachings of this invention.
Figure 2:
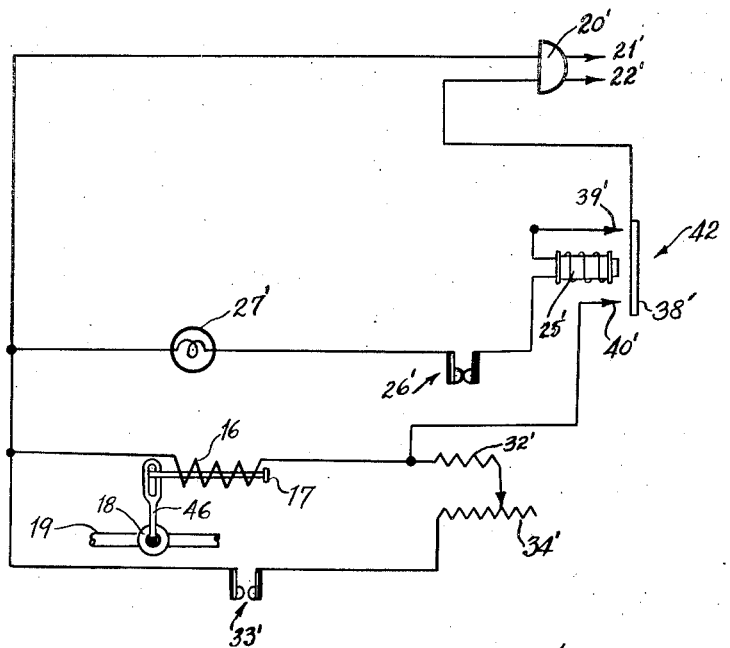
Fig. 2 is a wiring diagram of another adaptation of said system.

Referring to the drawings, the control circuit includes a means, which when a current passes therethrough, causes heat to be applied to a vessel or chamber containing the material to be heated. Such means may be an electric heating coil as 15 for instance, as in Fig. 1, or else, as indicated in Fig. 2, said means may be the coil 16 of a solenoid, the armature 17 of which, is adapted to operate a valve 18 controlling a supply of gas or other fuel through a pipe line 19 to a heater (not shown). Said valve 18 is normally closed, but is shifted to open condition by said armature 17 associated with said solenoid coil 16. It might here be noted that in all other respects, the full disclosure shown in Fig. 2, is included in Fig. 1. The numeral 20, designates a suitable plug for connection to the lines of a source of electrical energy, the power line connectors of which, are 21 and 22.

The circuit comprises a number of branches adapted for parallel connection across the power lines 21 and 22, by suitable switching means hereafter described. Branch A, whose terminals are designated by the numerals 23 and 24, consists of a coil 25 of an electro-magnetically operated switch, in electrical series connection with a normally closed thermostatic switch 26, and if desired also in electrical series connection in said branch A may be included an electric lamp or other electrically operated signal means 27. Branch B comprises the electrical heater coil 15, the terminals of which branch are designated by the numerals 28 and 29. Branch C whose terminals are 30 and 29, includes an electric heating coil 32 of comparatively small size, in series electrical connection with a normally open thermostatic switch 33, and if desired, a variable resistance 34, may be included in said branch C. A branch D, if desired to be included, comprises a lamp or other suitable electrically operated signal means 35; the terminals of said branch are indicated by the numerals 36 and 37. A terminal of each of said branches is connected electrically with one of the power lines, that is, terminals 23, 28, 30 and 36, are in electrical connection with line 21.

The numeral 38 designates the armature associated with coil 25. Said armature is in electrical connection with the power line 22, and when not attracted to said coil 25, is normally out of contact from the switch points 39 and 40, but in contact with switch point 41. Terminal 24 of branch A is in electrical connection with switch point 39; and terminal 29 common to branches B and C to switch point 40; and terminal 37 of branch D with switch point 41. Of course said switch point 41 is omitted, if branch D is not included. If desired, a key switch 43 may be interposed in electrical connection between line 22 and terminal 24 of branch A. This is shown in Fig. 1. In Fig. 2, all parts thereof which are included in Fig. 1, are designated by identical numerals marked prime.

Figure 3:
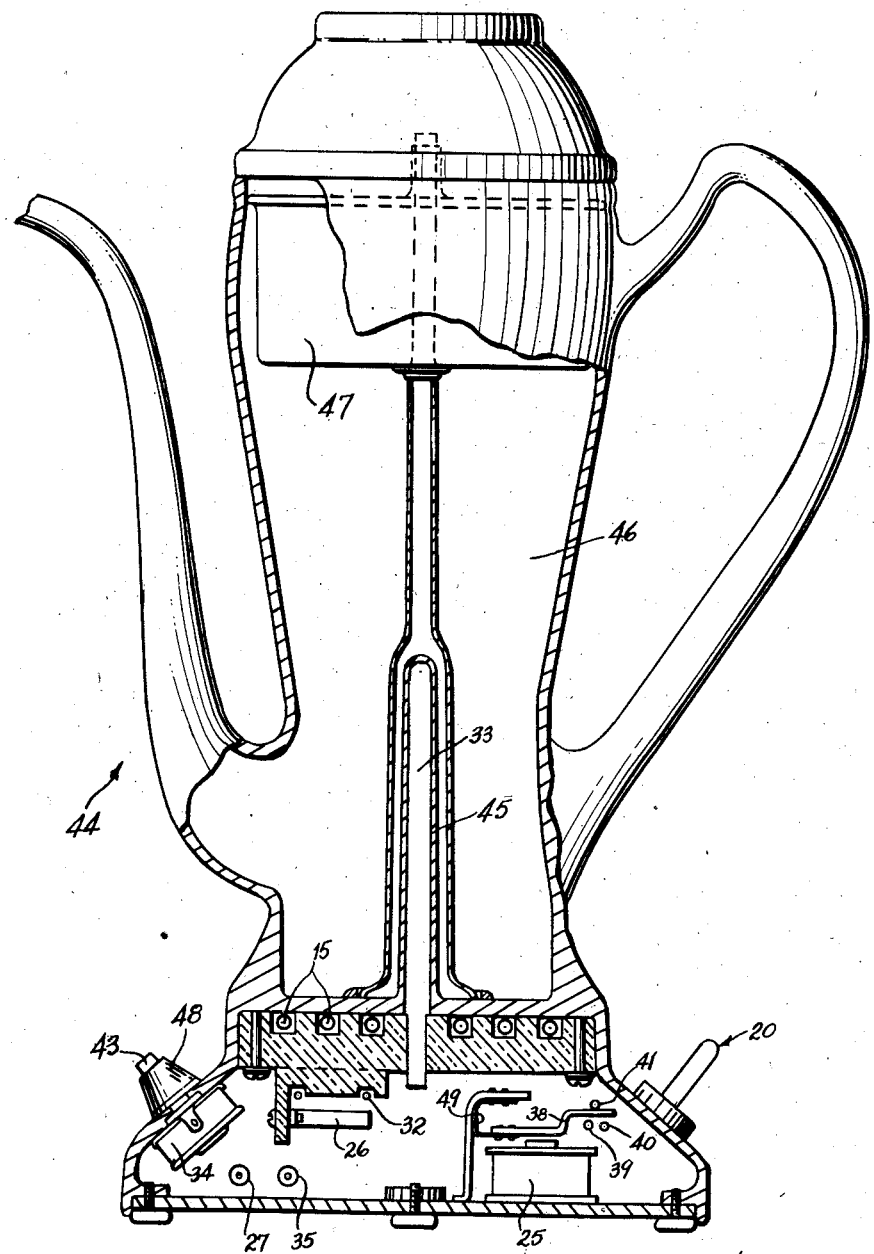
Fig. 3 is a partial sectional view of an electric coffee percolator embodying the apparatus shown in Fig. 1, wherein the electrical connections and various details of construction are omitted for sake of clarity.

As an adaptation, the circuit of Fig. 1, may be used for a percolator 44 as in Fig. 3. Here thermostatic switch 33 is mounted within 45, and is constructed in such manner that it will close the circuit of branch C when coffee within the percolator is heated to boiling. Auxiliary heater coil 32 is positioned adjacent thermostatic switch 26, and is adapted upon reaching a certain predetermined temperature, to open said switch 26; the time it takes to so act being controlled by the amount of the resistance coil 34 permitted in the circuit of branch C.

In operation, referring to initial condition as illustrated in Fig. 1, after a quantity of water is poured into percolator vessel 46 and a proper quantity of ground coffee is placed into compartment member 47, then upon connecting plug 20 to a source of electrical energy, current will flow through branch D whereby lamp 35 will be lighted, emitting for instance a red light. Key switch 43 is then manually closed for a moment, whereby current will pass through branch A, causing attraction of armature 38 to magnet coil 25, whereupon said armature will contact the points 39 and 40, and although key 43 returns to open condition, said armature will remain attracted to said magnet coil. Of course, lamp 35 will cease to be lit, but lamp 27 will be lit, emitting for instance a green light. Current will flow through branch B whereby coil 15 will heat the percolator and its contents. At any time up till now, the operator will adjust the variable resistance 34 thereby determining the period of percolation, which is the time interval between the closing of switch 33 and the opening of switch 26. The more resistance in branch C, the longer will such interval be.

As soon as the coffee starts to boil, switch 33 will close, and current will flow through branch C whereby coil 32 will heat up and when it reaches a certain predetermined temperature will operate switch 26 to open, whereupon current will cease to flow in branch A and hence coil 25 having no current flowing therethrough, will free armature 38, which will now automatically return to initial position due to action of a spring 49, urging such movement of course, armature 38, becoming separated from its contact with points 39 and 40, will cause cessation of current through the branches A, B and C, but now said armature 38, will again contact point 41 and lamp 35 will relight. It is evident that lamp 27 has been extinguished upon opening of the circuit of branch A. Lamp 27, when lit, acts as a signal means to indicate that the heating operation is in progress. Lamp 35, when lit, indicates that the coffee is ready. In the percolator embodiment of Fig. 3, pressable key 43 and the turnable knob 48 for regulating the variable resistance 34, may be a unitary structure mounted exposed on the exterior of the percolator body, and the lamps 27 and 35 as well as the plug 20 may be likewise mounted.

Referring to Fig. 2, the circuit maker 42, may be manually operated in the manner that to start operation, its armature 38' is manually moved towards the coil 25', thereby making contact with the points 39' and 40'. Current will now flow through the branches A' and B', lamp 27' will light and current flowing through solenoid coil 16, will actuate armature 17, whereupon arm 46 will be moved opening valve 18 thereby permitting a supply of fuel to flow to the heater to be ignited in any suitable manner provided therefor. The thermostatic switch 33' is positioned to be affected by the heat in the chamber or vessel being heated (not shown). The operation of this control system of Fig. 2, is evident from the explanation already given. Note is made that upon release of armature 38' from coil 25', armature 17 will automatically return to initial position by spring means (not shown) so urging same, whereupon arm 46 will be moved to initial position thereby closing the valve 18.

This invention is capable of numerous forms and various applications without departing from the essential features herein disclosed. It is therefore intended and desired that the embodiments herein disclosed be deemed illustrative and not restrictive and that the patent shall cover all patentable novelty herein set forth; reference being had to the following claims rather than to the specific description and showing herein, to indicate the scope of this invention.

I claim:

1. In a control system for automatically deactivating a heating means at a predetermined time after the material heated had attained a predetermined temperature, an electrical circuit comprising a first circuit portion including a conductor characterized in that upon the passage of an electric current therethrough, the heating means is energized to transfer heat to said material and a first switching means for connecting said conductor to a source of electrical energy, a second circuit portion shunting said conductor, comprising an auxiliary electric heating means and a normally open first thermostatically operated switch in series electrical connection with said auxiliary heating means; said first thermostatically operated switch being operated to close by the heat generated by the main heating means upon the material attaining a predetermined temperature, a third circuit portion including an electromagnetic coil, a normally closed second thermostatically operated switch in series electric connection with said coil; said second thermostatically operated switch being operated to open by the heat generated by the auxiliary heating means and a second switch means for connecting said third circuit portion to the source of electrical energy, and an armature having a normal initial rest position, adapted to be shifted to a moved position upon actuation of said electric magnetic coil and means to restore said armature to its initial rest position upon deactivating said coil; said armature being adapted upon assuming its moved position as it would be shifted upon actuation of said coil, to close the first and second switching means whereby current is made to flow through the first and third circuit portions, and upon return to its initial rest position, to open said first and second switching means whereby current through the aforesaid conductor is made to cease and the main heating means is thereby deactivated.

2. An electrical circuit as defined in claim 1, including a push button type switch shunted across the second switching means, whereby upon closing said push button type switch, the electromagnetic coil is actuated thereby shifting the armature to its moved position.

3. An electrical circuit as defined in claim 1, including an electrically operated signal means interposed in one of the circuit portions through which current passes immediately upon shifting of the armature to its moved position.

4. An electrical circuit as defined in claim 1, including a manually adjustable current regulating means interposed in the second circuit portion, adapted for the adjustment of the time interval between the closing of the first thermostatically controlled switch and the opening of the second thermostatically controlled switch.

5. An electrical circuit as defined in claim 1, wherein the conductor in the first circuit portion comprises an electric heating means.

6. A control system as defined in claim 1, including a valve for controlling the fuel supply to the main heating means and wherein the conductor in the first circuit portion comprises an electromagnetic means for operating said valve.

7. An electrical circuit as defined in claim 1, including a fourth circuit portion comprising a second electrically operated signal means and a third switching means for connecting said second signal means to the source of electrical energy and wherein the armature when in initial normal rest position is adapted to close said third switching means and upon the shifting of said armature to its moved position, to open said third switching means.

8. An electrical circuit as defined in claim 1, including an electrically operated signal means interposed in one of the circuit portions through which current passes immediately upon the shifting of the armature to its moved position, and including a fourth circuit portion comprising a second electrically operated signal means and a third switching means for connecting said second signal means to the source of electrical energy and wherein the armature when in initial normal rest position is adapted to close said third switching means and upon the shifting of said armature to its moved position, to open said third switching means; the signals effected upon operation of the respective signal means being of different character respectively.

9. An electrical circuit as defined in claim 1, including a variable resistance interposed in the second circuit portion, adapted for the adjustment of the time interval between the closing of the first thermostatically controlled switch and the opening of the second thermostatically controlled switch.

10. An electrical circuit as defined in claim 1, including a manually adjustable current regulating means interposed in the second circuit portion, adapted for the adjustment of the time interval between the closing of the first thermostatically controlled switch and the opening of the second thermostatically controlled switch, and electrically operated signal means interposed in one of the circuit portions through which current passes immediately upon shifting of the armature to its moved position.

11. An electrical circuit as defined in claim 1, including manually adjustable current regulating means interposed in the second circuit portion, adapted for the adjustment of the time interval between the closing of the first thermostatically controlled switch and the opening of the second thermostatically controlled switch, an electrically operated signal means interposed in one of the circuit portions through which current passes immediately upon the shifting of the armature to its moved position and a push button type switch shunted across the second switching means, whereby upon closing said push button type switch, the electromagnetic coil is actuated, thereby shifting the armature to its moved position.

12. An electrical circuit as defined in claim 1, including a manually adjustable current regulating means interposed in the second circuit portion, adapted for the adjustment of the time interval between the closing of the first thermostatically controlled switch and the opening of the second thermostatically controlled switch, an electrically operated signal means interposed in one of the circuit portions through which current passes immediately upon the shifting of the armature to its moved position, and a fourth circuit portion comprising a second electrically operated signal means and a third switching means for connecting said second signal means to the source of electrical energy and wherein the armature when in initial normal rest position is adapted to close said third switching means and upon the shifting of said armature to its moved position, to open said third switching means; the signals effected upon operation of the respective signal means being of different character respectively.

13. An electrical circuit as defined in claim 1, including a manually adjustable current regulating means interposed in the second circuit portion, adapted for the adjustment of the time interval between the closing of the first thermostatically operated switch and the opening of the second thermostatically operated switch, an electrically operated signal means interposed in one of the circuit portions through which current passes immediately upon the shifting of the armature to its moved position, a fourth circuit portion including a second electrically operated signal means and a third switching means for connecting said second signal means to the source of electrical energy and wherein the armature when in initial normal rest position is adapted to close said third switching means and upon the shifting of said armature to its moved position, to open said third switching means; the signals effected upon operation of the respective signal means being of different character respectively, and a push button type switch shunted across the second switching means, whereby upon closing said push button type switch, the electromagnetic coil is actuated, thereby shifting the armature to its moved position.

14. An electrical circuit as defined in claim 1, including a manually adjustable current regulating means interposed in the second circuit portion, adapted for the adjustment of the time interval between the closing of the first thermostatically operated switch and the opening of the second thermostatically operated switch, a fourth circuit portion including an electrically operated signal means and a third switching means for connecting said signal means to the source of electrical energy and wherein the armature when in initial normal rest position is adapted to close said third switching means and upon the shifting of said armature to its moved position, to open said third switching means, and a push button type switch shunted across the second switching means, whereby upon the closing of said push button type switch, the electromagnetic coil is actuated, thereby shifting the armature to its moved position.

PAUL V. COLOMBO.

REFERENCES CITED

The following references are of record in the file of this patent:

UNITED STATES PATENTS

| Number | Name | Date |
|---|---|---|
| 2,368,774 | Osterheld | Feb. 6, 1945 |